United States Patent [19]

Kueper

[11] 3,767,938

[45] Oct. 23, 1973

[54] ZERO SENSE AFTER PEAK DETECTION CIRCUIT

[75] Inventor: Terrance Wayne Kueper, Rochester, Minn.

[73] Assignee: International Business Machines Corporation, Armonk, N.Y.

[22] Filed: May 26, 1972

[21] Appl. No.: 257,080

[52] U.S. Cl. .............. 307/235 R, 307/291, 328/151

[51] Int. Cl. .............................................. H03k 5/20

[58] Field of Search ............................ 307/235, 291; 328/150, 151

[56] References Cited

UNITED STATES PATENTS

| | | | |
|---|---|---|---|
| 3,639,779 | 2/1972 | Garrigus | 307/235 R |
| 3,659,208 | 4/1972 | Fussell | 328/151 X |

*Primary Examiner*—John Zazworsky

*Attorney*—Donald F. Voss et al.

[57] ABSTRACT

A zero sense after peak detection circuit for rejecting noise signals includes a peak detect and hold circuit which resets a latch only if the input signal has exceeded a predetermined negative threshold voltage which is a fixed percentage of a valid signal. After the input signal exceeds the predetermined negative threshold voltage and the latch is reset, the latch is then set when a zero sense circuit senses the input signal crossing zero.

9 Claims, 3 Drawing Figures

ZERO SENSE AFTER PEAK DETECTION CIRCUIT

BACKGROUND OF THE INVENTION

1. Field of the Invention

This invention relates to discriminator circuits and more particularly to such circuits where the input signal is sinusoidal and still more particularly to circuits for sensing the zero crossing of the input signal and not responding to noise signals having an amplitude below a certain percentage of a valid input signal.

The invention is particularly useful for sensing output signals from a magnetic transducer. Magnetic transducers are frequently used for generating timing signals in response to sensing a change in reluctance in a moving member such as a timing disc. The timing disc is usually synchronized with other media containing coded data. The timing disc can be integral with or separate from the other media which contains the coded data. For example, the timing disc may be part of a magnetic disk pack containing coded data. It is essential that noise pulses are not mistaken for timing signals in order that the coded data can be properly sensed. Noise pulses can originate from dents or marks in the timing disc. Normally, the signal produced by a dent or mark has the same wave shape but has an amplitude which is substantially less than the amplitude of a valid timing signal. By requiring that the input signal have a magnitude which exceeds a predetermined percentage of a valid signal the noise pulses can be rejected even though the valid signal varies in amplitude.

2. Description of the Prior Art

Prior art circuits for rejecting noise signals operate with a fixed rejection level rather than having the rejection level a predetermined percentage of the valid input signal. Thus the prior art circuits could not vary the rejection level as the valid input signals vary in amplitude. For example, U.S. Pat. No. 3,151,256 shows a Schmitt trigger having negative set and reset voltage levels determined by input clamping networks. One of the clamping networks provides a fixed reference voltage to the input circuit to establish the value below which the input signal must pass in order to transfer the trigger to its reset condition. The other clamping circuit provides a reference voltage for establishing a value above which the input signal must rise in order to transfer the trigger to its set condition. Neither reference voltage is related to a percentage of the input signal. This is also true with respect to the circuit in U.S. Pat. No. 3,600,688. The circuit of this patent discriminates input pulses greater than a minimum amplitude and less than a maximum width from other pulses. The minimum amplitude level is set by a fixed reference voltage.

The circuit of this invention has the advantage that the rejection level is related to a percentage of a valid signal. Hence, as valid signals are generated such as by a magnetic transducer, the rejection level is set at a predetermined percentage of the amplitude of these valid signals. Thus, if the amplitude of a valid signal varies then the rejection level correspondingly varies. This is advantageous because the output signals from different transducers can vary from transducer to transducer and if fixed rejection levels were used, it would be necessary to tune the rejection level to the particular transducer. Further, this tuning would also be necessary as the output signal from a transducer varies due to operating conditions.

SUMMARY OF THE INVENTION

The invention provides an improved discriminator circuit which stores a rejection level which is a predetermined percentage of a valid input signal. The stored rejection level must then be exceeded by a succeeding input signal before an indicator is reset by the input signal whereby a zero crossing detection circuit sets the indicator as the input signal passes through zero volts. The setting of the indicator is indicative of a valid input signal. A noise signal never exceeds the rejection level and thus the indicator is not reset. Therefore, when the noise signal passes through zero volts, there is no setting of the indicator because it is still set.

Thus, the principal object of the invention is to provide an improved discriminator circuit which: (a) has noise rejection based on a fixed percentage of valid input signals over a wide range of input signal amplitudes; (b) enables sensing the input signal passing through zero volts and generating an output signal only after the input signal has exceeded a predetermined voltage amplitude; (c) provides hysteresis so that the output switches cleanly when the input signal passes through zero volts; and (d) provides a constant switch point irrespective of signal amplitude.

DETAILED DESCRIPTION

Figure 1:
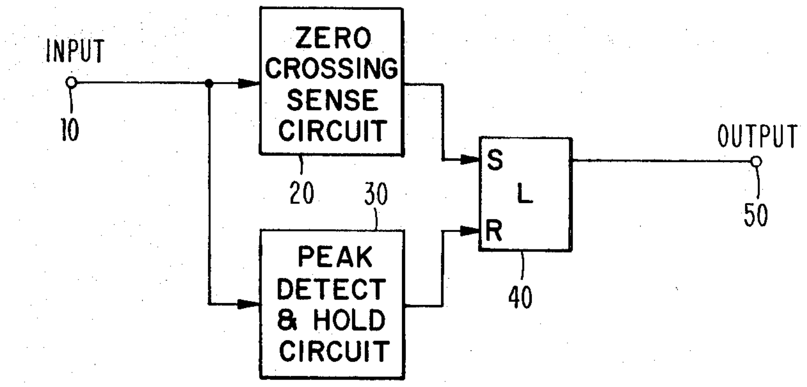
FIG. 1 is a block diagram illustrating the invention.
Figure 2:
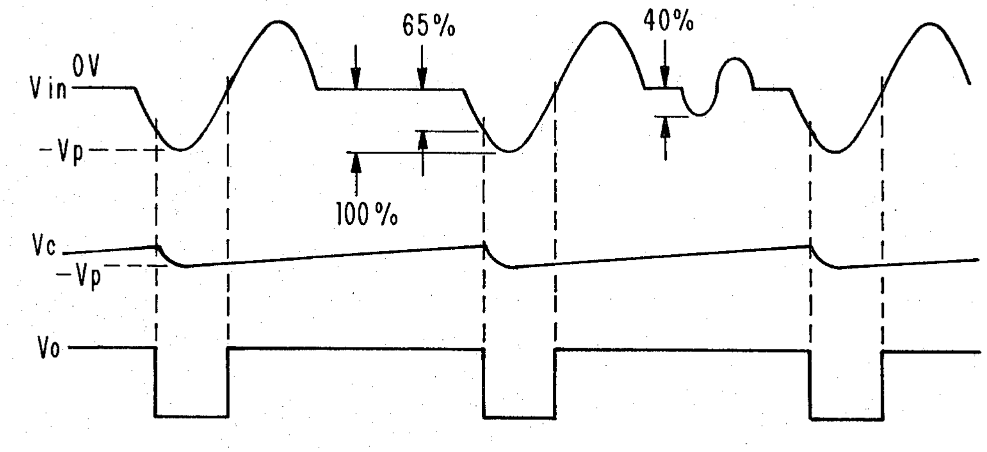
FIG. 2 is a waveform diagram illustrating the input signal Vin, a stored rejection level signal Vc and the output signal Vo.

With reference to the drawings and particularly to FIG. 1, the invention is illustrated by way of example as including input terminal 10 for receiving the input signal Vin as shown in FIG. 2. The input terminal 10 is connected to inputs of zero crossing sense circuit 20 and peak detect and hold circuit 30. The zero crossing sense circuit 20 functions to detect when the input signal passes through zero volts. It is advantageous to sense the zero crossing point because this provides a constant switch point even though the input signal amplitude may vary.

Because the zero crossing sense circuit 20 responds to the input signal passing through zero, it then becomes necessary to provide a means for rejecting noise signals because these signals also pass through zero. The peak detect and hold circuit 30 together with latch 40 provide the means for rejecting noise signals. The output of the zero crossing sense circuit 20 is connected to set latch 40. However, peak detect and hold circuit 30 resets latch 40 only if the input signal has exceeded the rejection level. In this particular example, the rejection level is approximately 65 percent of the negative peak of a valid input signal.

Latch 40 then remains reset until the input signal Vin passes through zero. When this occurs, latch 40 is set. The setting of latch 40 indicates a valid input signal. The output signal Vo appearing at terminal 50 is shown in FIG. 2. It should be noted in FIG. 2 that the first two input signals are valid signals. The third signal is a noise signal occurring between the second and third valid input signals. The negative peak amplitude of the noise signal is approximately 40 per cent of the negative peak of the previous or second valid input signal. Thus, peak detect and hold circuit 30 does not generate an output signal for resetting latch 40. Hence, there is no change in signal level at output terminal 50 when the noise signal passes through zero volts as detected by circuit 20.

Figure 3:
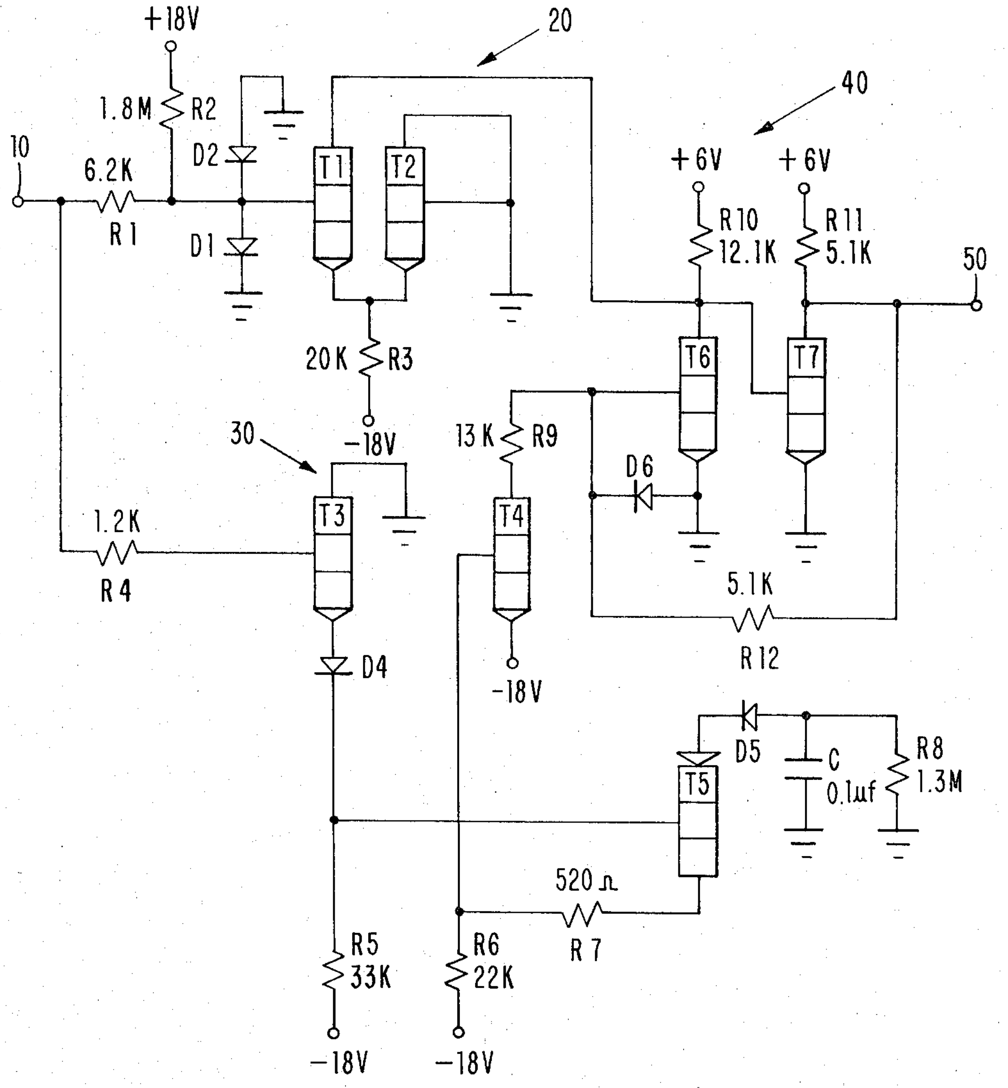
FIG. 3 is a schematic circuit diagram illustrating a preferred embodiment of the invention.

In FIG. 3, the zero crossing and sense circuit 20 includes transistors T1 and T2 connected to form a differential comparator. The input signal Vin is applied to the base of transistor T1 via resistor R1. Resistor R1 prevents loading the input terminal 10 when diodes D1 and D2 are performing their clamping function. Diode D1 prevents the collector of transistor T1, when transistor T1 saturates, from going more positive than a saturated collector-emitter drop above ground. Diode D2 protects the base emitter junction of transistor T1 to prevent it from going more negative than one diode drop below ground. Resistor R2, which is connected between +18 volts and the base of transistor T1, provides base current into transistor T1. The base and collector of transistor T2 are connected to ground. The base connection of transistor T2 to ground provides a zero volt switch point for transistor T1. The collector of transistor T2 is connected to ground merely to reduce power dissipation. The emitters of transistors T1 and T2 are connected to −18 volts via resistor R3 which functions as a current source for transistors T1 and T2.

Input terminal 10 is also connected to the base of transistor T3 via resistor R4. Transistor T3 is part of the peak detect and hold circuit 30. Resistor R4 functions in a manner similar to resistor R1 so as to prevent loading down input terminal 10 when the base collector junction of transistor T3 becomes forward-biased. Transistor T3 is connected as an emitter follower with its collector connected to ground. The connection of the collector to ground permits greater swings in the negative direction at the base of transistor T3. The emitter of transistor T3 is returned to −18 volts via diode D4 and resistor R5. Resistor R5 functions as a current source whereas diode D4 provides a diode drop for offsetting the diode drop of diode D5 and thereby enabling the charging of capacitor C without D.C. offset.

The base of transistor T5 is connected to the cathode of diode D4 and the emitter of transistor T5 is connected to the cathode of diode D5. The collector of transistor T5 is connected to the base of transistor T4 via resistor R7. Resistor R7 functions as a current limiting resistor for the collector of transistor T5.

Transistor T5 causes capacitor C to charge with a negative charge as the input signal Vin goes negative. A peak charge is stored on capacitor C when the input signal reaches its negative peak. Thereafter, as the input signal begins to go positive, capacitor C discharges to ground via resistor R8. Resistor R8 is connected to ground potential and controls the rate of discharge.

The base of transistor T4 is also connected to −18 volts via resistor R6. The collector of transistor T4 is connected to the base of transistor T6 via resistor R9 and the emitter of transistor T4 is connected to −18 volts. By this arrangement, the conduction of transistor T4 is controlled by transistor T5. Resistor R6 which is connected in the base circuit of transistor T4 holds transistor T4 off when transistor T5 is off. Transistor T4 conducts when transistor T5 conducts.

Transistors T6 and T7 are connected to form latch 40. The collector of transistor T6 is connected to the base of transistor T7 and the collector of transistor T7 is connected to the base of transistor T6. Additionally, the collectors of transistors T6 and T7 are connected to +6 volts via resistors R10 and R11, respectively. The emitters of the transistors T6 and T7 are connected to ground potential. Diode D6 connected between the emitter and base of transistor T6 functions to prevent breakdown of the base emitter junction of transistor T6.

The collector of transistor T1 is connected to the collector of transistor T6 which in turn is connected to the base of transistor T7 to provide the set input for latch 40. The reset input to the latch is the connection of the collector of transistor T4 into the base of transistor T6. The output of the latch is taken from the collector of transistor T7.

One valid pulse is required to initialize the circuit. The initializing signal, which is the first signal Vin in FIG. 2, starts at zero volts and then goes negative. At zero volts, transistors T1 and T2 will both be conducting. Then, as the input signal Vin goes negative, transistor T1 turns off and transistor T2 conducts all of the current. Transistor T3 conducts as an emitter follower and the negative potential at the emitter of transistor T3, as the input signal goes negative, is applied to the base of transistor T5. The potential at the base of transistor T5 will thus be more negative than the potential at the emitter of T5 because capacitor C is at ground potential and diode D5 is forward biased. Capacitor C charges as transistor T5 conducts. Further, with transistor T5 conducting, the base of transistor T4 is rendered sufficiently positive to cause transistor T4 to conduct. As transistor T4 conducts, its collector current causes the base emitter junction of transistor T6 to be back biased and thereby cutting off conduction of transistor T6. This causes the potential at the collector of transistor T6 to rise. The rise in potential at the collector of transistor T6 causes transistor T7 to conduct. Conduction of transistor T7 causes the potential at the collector of transistor T7 to go negative. The output signal Vo appearing at terminal 50 goes to a down level. This down level is fed back to the base of transistor T6 to hold transistor T6 off.

When the input signal Vin starts its positive excursion, transistor T2 is still conducting all of the current and transistor T1 is off. The emitter of transistor T3 follows the positive excursion of the input signal and this causes the base of transistor T5 to be more positive than the emitter of transistor T5 because of the negative charge on capacitor C. Thus, transistor T5 cuts off and this in turn causes transistor T4 to stop conducting. With transistor T4 cut off, the base emitter junction of transistor T6 is still back biased. Transistor T6 can now be turned on by turning off transistor T7. Transistor T7 is turned off when the input signal Vin passes through zero volts. When this occurs, transistor T1 is caused to conduct and transistor T2 continues to conduct but conducts a lesser amount of current. Conduction of transistor T1 causes the base of transistor T7 to go negative and transistor T7 turns off. When transistor T7 turns off the potential at its collector rises, thus causing a rise in potential at output terminal 50. Further, this rise in potential causes transistor T6 to turn on. When transistor T6 turns on, the potential at its collector goes negative and this causes transistor T7 to be held off.

The input pulse Vin continues to rise until it reaches its positive peak. Thereafter, it returns to zero volts and remains at this level until the next pulse comes along. During the time that the input signal Vin remains at zero volts, capacitor C is discharging. Hence, the threshold or rejection level depends upon the RC time constant established by capacitor C and resistor R8 and the period between the occurrences of valid input signals.

In this particular example, the next input pulse has a negative peak which exceeds the threshold or rejection level. Therefore, when this level is exceeded the emitter of transistor T3 causes the base of transistor T5 to be more negative than the emitter of transistor T5 which is at the potential of the capacitor C. Thus, transistor T5 will conduct and thereby cause transistor T4 to conduct in the manner previously described. Conduction of transistor T4 causes transistor T6 to turn off and thereby turn on transistor T7. This causes the potential at output terminal 50 to go to a down level. The output potential at terminal 50 then remains at the down level until the input signal Vin passes through zero volts. When the input signal Vin passes through zero volts, transistor T1 turns on as previously described and this switches transistor T7 off. The output potential at terminal 50 rises and transistor T6 turns on. Transistor T6 remains on as the input signal Vin continues to go positive.

The next input pulse Vin shown in FIG. 2 is a noise pulse. The negative peak of this noise pulse does not go below the threshold or rejection level. The negative peak of this noise signal reaches approximately 40 per cent of the negative peak of the previous signal. Thus, even though the emitter of transistor T3 goes negative, the base of transistor T5 does not become more negative than the emitter of transistor of T5. This is because the negative charge on capacitor C is still greater or more negative than the negative peak of the noise signal. Further, because transistor T5 is not turned on, transistor T4 will not be turned on and therefore transistor T6 remains on. With transistor T6 on, transistor T7 continues to be off and therefore, when the noise signal passes through zero, it will be detected by turning transistor T1 on but this will not have any effect at the output terminal 50 because transistor T7 is already off.

The next input signal Vin is a valid input signal and its negative peak is more negative than the charge on capacitor C. Thus, as the input signal Vin goes more negative than the rejection level on capacitor C, transistor T5 turns on thus causing transistor T4 to conduct. This causes transistor T6 to turn off and transistor T7 to turn on. Transistor T6 remains off and transistor T7 remains on until the input signal Vin passes through zero. When this occurs, transistor T1 turns on causing transistor T7 to turn off. The output signal appeared at terminal 50 as transistors T6 and T7 turned off in sequence as described.

From the foregoing, it is seen that the invention provides a circuit for generating an output signal only after the input signal has exceeded a rejection threshold level and then passes through zero volts. By this arrangement, it is seen that any noise pulses having an amplitude less than a predetermined percentage of the peak amplitude of a valid signal will not cause an output signal even though the noise signal passes through zero. Further, it is seen that the rejection level is a percentage of the peak amplitude of a valid signal. Thus, noise rejection is provided over a wide range of input amplitudes.

What is claimed is:

1. A discriminator circuit comprising an input terminal for receiving periodic time varying input signals having excursions through zero volts, first means connected to said input terminal and responsive to a time varying input signal having a predetermined peak amplitude for setting and holding a threshold level at a predetermined percentage of said peak amplitude of said time varying input signal and generating an output signal when the peak amplitude of other time varying input signals exceeds said threshold level, second means connected to said input terminal for generating a signal in response to an input signal passing through zero volts, and bistable indicating means having one input connected to receive an output signal from said first means so as to be set in one state and a second input connected to receive an output signal from said second means to be set in another state whereby said bistable indicating means is set to said one state only when an other input signal exceeds said threshold level held by said first means and set to said another state after having been set to said one state when said second means detects said input signal passing through zero volts.

2. The discriminator circuit of claim 1 wherein said bistable indicating means is a latch.

3. The discriminator circuit of claim 1 wherein said threshold level is substantially 65 per cent of the peak amplitude of an input signal.

4. The discriminator circuit of claim 1 wherein said first means sets and holds a threshold level at a predetermined percentage of the negative peak of an input signal.

5. The discriminator circuit of claim 1 wherein said first means comprises a capacitor, a unidirectional charging circuit connected to said capacitor, and a discharge circuit connected to said capacitor whereby an input signal charges said capacitor as said input signal makes an excursion in one direction and after said input signal reaches a peak in said one direction said capacitor discharges to said threshold level.

6. The discriminator circuit of claim 5 wherein said unidirectional charging circuit comprises first and second emitter followers, a first diode connected between said first and second emitter followers, and a second diode connected between said second emitter follower and said capacitor.

7. The discriminator circuit of claim 5 wherein said discharge circuit comprises a resistor connected between said capacitor and ground potential.

8. The discriminator circuit of claim 1 wherein said second means comprises a differential comparator referenced to ground potential.

9. The discriminator circuit of claim 2 wherein said latch comprises first and second transistors with the collector of the first transistor connected to the base of said second transistor and the collector of the second transistor connected to the base of said first transistor.

* * * * *